Aug. 15, 1939.    R. F. WARREN    2,169,825

METHOD OF MAKING AN ARTICLE

Original Filed Feb. 8, 1934

INVENTOR
Richard F. Warren.
BY
John H Hanrahan
ATTORNEY

Patented Aug. 15, 1939

2,169,825

UNITED STATES PATENT OFFICE 2,169,825

METHOD OF MAKING AN ARTICLE

Richard F. Warren, Stratford, Conn.

Application February 8, 1934, Serial No. 710,320
Renewed May 3, 1938

9 Claims. (Cl. 41—26)

This invention relates to new and useful improvements in pressed or moulded articles and the method of pressing or moulding such articles.

An object of the invention is to provide an article pressed or moulded from a material including a light transmitting resin and having printing, either in the form of words or of ornamental figures, etc., visible through but protected by the surface material of the article.

Another object is to provide a method of manufacturing the article mentioned.

Other objects and advantages will become apparent from a consideration of the following detailed description wherein a satisfactory embodiment of the invention is disclosed. It is to be understood that the invention is not limited to the details disclosed but includes all such variations and modifications as fall within the spirit of the invention and the scope of the appended claims.

The present application is a continuation in part of my application Serial Number 466,038, filed July 7, 1930. I have found that if in the pressing or moulding of an article from a material including a clear or transparent resin, the article is printed on prior to the final pressing or moulding or finishing operation, the resin will be drawn out through the printing ink and form a covering over it protecting it against scratching or against being washed off the article.

If the article is made up for example in the form of a disc of fibrous material coated or impregnated and coated with the material including a transparent resin the printing may be made on this coated or impregnated article or disc when the coating or impregnated material is dry. Any resin which is transparent may be used. The coating or impregnating material need not be pure resin but may be a transparent resin with any of the usual fillers, pigments, plasticizers and the like.

It is not necessary that the article be of laminated construction or include a disc or other shape of core. The same results are obtained by shaping the article in a mould or press and before the final pressing or moulding or finishing operation, and preferably when the material has been pressed or moulded only sufficiently to shape or form it, it is printed on.

The printing as above suggested may be in the form of words or it may be of any desired design or scene or the like. After the printing is applied to the coated sheet or to the shaped or formed article, as above explained, the coated and printed sheet or the shaped or formed article is pressed or moulded or given its final pressing or moulding or finishing treatment, under heat and/or pressure if necessary.

In this final pressing or moulding or finishing operation the resin contained in the coating material or in the partially moulded material is drawn to the surface of the article being made. This gives the article a glossy and finished appearance and a tough surface. The resin is drawn through or about the printing ink and completely covers it whereby the outer surface of the article, over the printing, has the usual glossy finished tough surface. Therefore, the printing is really below the surface of the article and is fully protected so as not to be washed, scratched or worn off.

Of course, the ink used should be of a color contrasting with that of the pigment, fillers, etc., used with the resin in making the articles being pressed or moulded. Since the resin in each instance is transparent and is the substance drawn to the surface over the printing in the final pressing or moulding operation it will be understood that the printed matter is fully visible in the finished articles.

Figure 1:
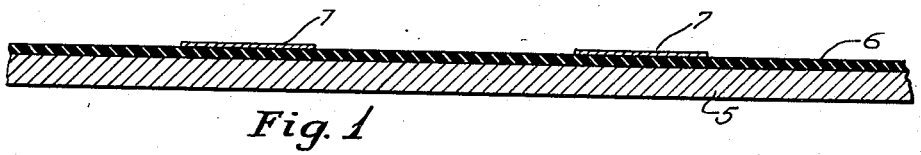
Fig. 1 is a sectional view, on an enlarged scale, showing a portion of a flat object at one point in the making of the object according to the invention.

Referring to Fig. 1 of the drawing at 5 is shown a flat body portion as, for example, a portion of the body of a phonograph record or other flat article. This body may be of solid stock or it may be laminated as desired or as may be required. On the upper surface of the body is a coating 6, the thickness of which is shown greatly exaggerated, and which coating includes a transparent resin together with pigments, fillers etc. as required.

Figure 2:
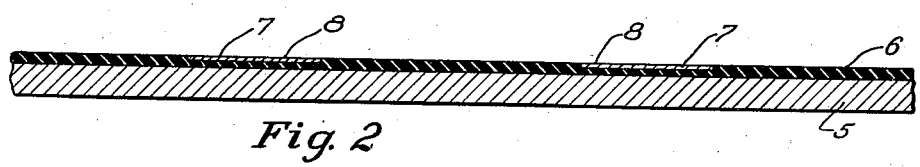
Fig. 2 is a similar view of a portion of the finished object.

Preferably after the coating has dried it is printed on, the printing being shown of exaggerated thickness at 7 in Fig. 1. Now the article has progressed to the finishing stage and it is finished through the application of heat and pressure and the finishing operation draws resin of the coating 6 out through the printing 7 so that the finished article is as shown in Fig. 2. There the top surface of the coating, represented by the line 8, is the surface glaze of the article and it is noted that the resin forming such surface glaze extends over the printing 7 and that the latter is therefore protected.

Figure 3:
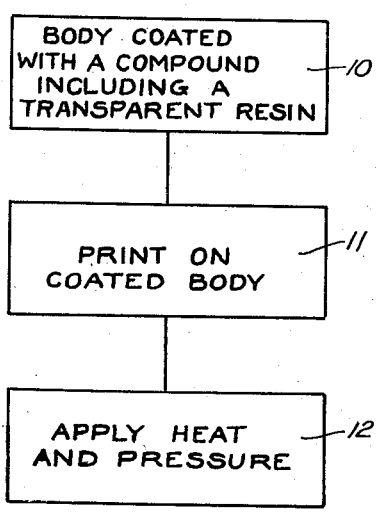
Fig. 3 is a chart showing the steps for producing the object of Fig. 2.

Fig. 3 in chart form shows the steps of making the article of Fig. 2. As indicated by the first rectangle 10 a body is provided and coated with a compound including a transparent resin. This coating may be applied to either or both surfaces of the article. Next the coating is printed on as suggested by the rectangle 11 and as suggested at 12 the coated and printed body is given the finishing treatment by the application thereto of heat and pressure.

Figure 4:
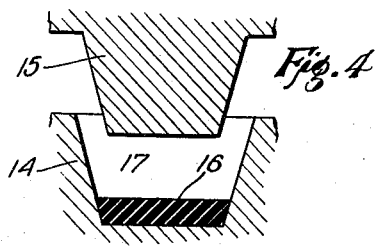
Figs. 4 through 7 are diagrammatic views showing the successive steps involved in producing a hollow object in accordance with the teaching of the invention.
Figure 5:
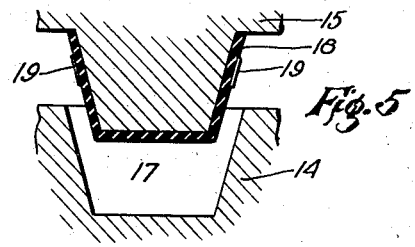

In Figs. 4 through 7 the method of making a hollow article, as a tumbler, is shown. There the die member 14 having the cavity 17 is associated with a force 15. In Fig. 4 the mould is open and the material 16 to be moulded is within the cavity 17. In Fig. 5 the mould has been closed and is again open, an article 18 having been shaped and printed on at 19.

Figure 6:
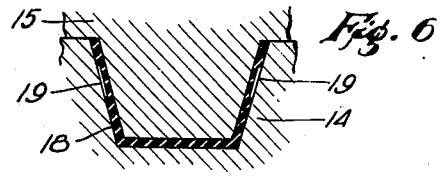
Figure 7:
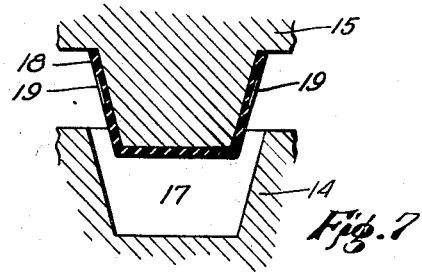

In Fig. 6 the mould is closed for the final treatment of the article after the printing operation. In Fig. 7 the mould is being again opened with the finished article 18 on the force 15. There it is noted that the printing 19 is under the surface glaze of the article, such glaze being formed by resin which is drawn to the surface during the finishing operation. Over the printing the surface glaze is represented by a rather heavy line.

While the invention, in the application identified above, is disclosed as applied to the manufacture of phonograph records wherein vinyl is used as a resin it will be clear that the invention is not limited to any particular article or to any particular resin. The printing on various articles presents various problems but the method and result are the same. The printing is done before the final pressing or moulding or finishing operation and during such operation the transparent resin covers the printing as above set forth and the material being moulded may contain the proportions of resin as heretofore.

Any suitable or desired subject matter or design or the like may be printed on the article prior to the final pressing or moulding or finishing operation. This printing may, as above suggested, be done on a coated sheet or body prior to any pressing or moulding or finishing operation or after an article either with or without a core, has been formed but prior to the final moulding or pressing or finishing of the article. In its final finished, moulded or pressed state the moulding material has its resin drawn to its surfaces. It is before this occurs that the printing must be accomplished and in the following claims the reference to the final moulding or pressing or finishing operation is to be understood to include the last or final step of the moulding. The printing may be done in a press or by means of a stencil or a hand stamp or the like.

That is such expression is intended to means that the printing operation takes place at any time prior to the closing of the press for the last or final time. The printing operation may take place before the material is introduced into the mould or after the material is partially moulded but the printing operation is always performed prior to the final moulding or pressing or finishing operation and may for example take place when the press is opened to "gas" the work or at any other suitable time in the manufacture of the article.

The resin used may be vinyl, styrol, urea formaldehyde, phenol, cresol, cresylic acid and formaldehyde types tar acid formaldehyde resins and compounds from poly alcohols and polyvalent acids of which glyptal a glycerine phthalic anhydride resin is an example and the desired or usual proportions of fillers, pigments and the like may be added depending on the article to be made.

From this it will be clear that the resins used may be either thermo-plastic or thermo-setting. Further, it is to be understood that where the resins are described either in the specification or claims as being clear or transparent it is intended to cover resins of such clearness or transparency that the printing will be visible through a coating of such resins. The phonograph record of vinyl resin, without the printing feature disclosed, is covered in my application above identified and forms no part of the present application which is to be understood as limited to the printing feature as applied to any object as above explained.

Having thus set forth the nature of my invention, what I claim is:

1. The method of making a moulded article of a material including a transparent resin, comprising moulding said article of said material, printing on the article, and then moulding the article in the presence of heat to draw the resin over the printing.

2. The method of making an article including a core comprising coating the core with a material including a transparent resin, printing on the coating, and then pressing the coated and printed core to finish the article.

3. The method of making a pressed article of a material including a transparent resin, comprising shaping the article of said material under heat and pressure, printing on said article, and then by heat and pressure drawing the resin over the printing.

4. The method of making an article including a core comprising coating the core with a material including a transparent resin, applying printing to said coating, and then by heat and pressure drawing the resin over the printing.

5. The method of making a moulded article of a material including a transparent resin, comprising shaping the article of said material, applying printing to said shaped article, and then by heat and pressure drawing the resin over the printing.

6. The method of making an article of a material including a transparent resin, comprising applying printing to the article, and then moulding the article in the presence of heat to draw the resin over the printing.

7. The method of making an article of a material including a plastic binder forming a transparent film when subjected to heat and pressure, comprising applying printing to such material, and then applying pressure to said material in the presence of heat to draw said plastic binder over the printing to form a transparent film thereover.

8. The method of making an article of a material including a transparent resin, comprising shaping the article of said material, applying printing to said shaped article, and then by heat drawing the resin over the printing.

9. The method of making an article of a material including a transparent resin, comprising shaping the article of said material, applying printing to the shaped article, and then by pressure drawing the resin over the printing.

RICHARD F. WARREN.